(12) United States Patent
McGlinchey

(10) Patent No.: US 6,919,742 B1
(45) Date of Patent: Jul. 19, 2005

(54) FAST ETHERNET AND ETHERNET DRIVER

(75) Inventor: Gerard Francis McGlinchey, Co. Wicklow (IE)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/420,368

(22) Filed: Oct. 18, 1999

(51) Int. Cl.[7] .................................................. H03K 3/00
(52) U.S. Cl. ..................... 327/108; 327/170; 327/109; 327/110; 326/82; 326/86
(58) Field of Search ........................... 327/108, 170, 327/330, 109, 110; 326/82, 83, 30, 86, 63; 325/21

(56) References Cited

U.S. PATENT DOCUMENTS

| | | | | |
|---|---|---|---|---|
| 3,843,834 A | * | 10/1974 | Burke ........................... | 325/21 |
| 4,384,363 A | * | 5/1983 | Lipcon ........................ | 455/58 |
| 5,309,036 A | | 5/1994 | Yang et al. .................. | 327/110 |
| 5,379,209 A | * | 1/1995 | Goff ............................ | 363/132 |
| 5,485,488 A | | 1/1996 | Van Brunt et al. .......... | 325/257 |
| 5,747,893 A | | 5/1998 | Bennett et al. .............. | 307/100 |
| 5,835,239 A | * | 11/1998 | Kim ............................ | 358/468 |
| 6,121,800 A | * | 9/2000 | Leighton et al. ............ | 327/110 |
| 6,323,686 B1 | * | 11/2001 | Bisson et al. ................ | 326/82 |

* cited by examiner

*Primary Examiner*—Tuan T. Lam
*Assistant Examiner*—Hiep Nguyen
(74) *Attorney, Agent, or Firm*—Wolf, Greenfield & Sacks P.C.

(57) ABSTRACT

A driver circuit for driving a line in a network comprises first driving means for driving the line, second driving means for driving the line, and switching means for switching between the first and second driving means. A method for providing multi-mode driver capability is also described. The method comprises the steps of providing a line driver circuit including both a current source and a voltage source, selecting a first or second mode of operation, operating the line driver circuit in a first configuration when the first mode of operation is selected, and operating the line driver circuit in a second configuration when the second mode of operation is selected.

13 Claims, 10 Drawing Sheets

FAST ETHERNET AND ETHERNET DRIVER

FIELD OF THE INVENTION

This invention relates generally to line driver circuitry and in particular to line drivers suitable for use in an Ethernet environment, and is more particularly directed toward a driver circuit for use with twisted pair cable in Ethernet and Fast Ethernet architectures.

BACKGROUND OF THE INVENTION

Ethernet™ is a network communication system developed and standardized by DEC, Intel, and Xerox using baseband transmission, Carrier Sense Multiple Access/ Collision Detection (CSMA/CD) access, logical bus topology, and coaxial cable. A shared media network architecture, subsequently defined in the Institute of Electrical and Electronics Engineers (IEEE) 802.3 standard, it is currently the most popular architecture used in local area networks, and has been extended for operation using fiber optics, broadband, and unshielded twisted pairs. Ethernet is currently implemented using two main variants: Ethernet and Fast Ethernet.

The Ethernet or 10 BaseT is a variant architecture based on the foregoing standard and operates up to 10 Mbps (megabits per second), using unshielded twisted pair cable (UTP). A 10 BaseT architecture is also known as twisted pair Ethernet or UTP Ethernet. A second Ethernet standard, which includes implementations capable of 100 Mbs transmission speeds, is defined in IEEE 802.3u, and is referred to as Fast Ethernet or 100 Mbs Ethernet. A third implementation capable of 1 Gbps (gigabit per second) transmission is currently being standardised.

The Ethernet™ system is used to link various nodes using a specific topology within a networked system, and initially utilised a coaxial cable with nodes tapped off the cable. A node is generally a device such as a personal computer, a workstation, server, bridge, or router, which is connected to the network at a single location. The topology is the logical pattern formed by the nodes of a network; i.e., the way the nodes are interconnected.

Topologies are either physical or logical. A physical topology is the configuration of nodes and links and describes the physical relationship between these nodes and links, whereas the logical topology describes which pairs of nodes are able to communicate and whether or not they have a physical connection. Local area networks (LANs) are usually configured in one of three topologies: star, ring, or bus.

Ethernet™ generally uses a star topology having nodes connected to a hub or switch box. The standard cable for use in both Ethernet and Fast Ethernet situations is a Category 5 (CAT5) cable, supporting transmissions up to 100 Mbps, but also backwards compatible; i.e., can support 10 Mbps transmissions. Each node may be connected to a hub using up to 100 m of CAT5 cable.

In order to drive a signal over a network, it is necessary to use an Ethernet driver. In the star topology, the hubs or switches serve to restore a signal's amplitude and timing between nodes, as it is not possible to drive a signal using Ethernet technology more than 100 meters before amplification is required.

Known Fast Ethernet (100 BaseTx) and Ethernet (10 BaseT) drivers can drive a signal up to 100 meters along CAT5 twisted pair cable. Drivers may be either current or voltage driven. Ethernet drivers typically require an output voltage with an accuracy of ±12%, whereas Fast Ethernet requires improved output voltage accuracy of ±5%.

Although it is possible to use a current source to drive both Ethernet and Fast Ethernet, it is preferable to use a voltage source to drive Fast Ethernet, as the accuracy levels achieved are much higher. It is possible for hubs to support exclusively Ethernet, exclusively Fast Ethernet, or both modes. All systems incorporate an Ethernet controller that determines the speed at which signals should be sent, and the standard describes how initial set-up is effected. For example, a hub may initially drive a card driver at Fast Ethernet speeds, and then check to see if a valid response is obtained. If it is not, then the hub will resend using Ethernet speeds.

Typically, the drivers are connected to the CAT5 cable by a 1:1 transformer and an RJ45 connector, and operate with a standard 3.3V power supply over a temperature range of 0° C. to 70° C. An example of such an Ethernet driver is shown in FIG. 1.

The Ethernet driver 1 takes internal differential signals, inp and inn, and generates differential output signals capable of driving the CAT5 cable 2 in the manner previously described; i.e., by way of 1:1 transformer 3. The other end of the cable 2 connects to a second isolating 1:1 transformer 4, and the inputs 5 to an Ethernet receiver, rxp and rxn, are terminated in 50 Ohms. The source impedance at txp and txn is also 50 Ohms.

In the case of Fast Ethernet (100 BaseTx), the MLT3 encoded differential output voltage (txp, txn) level is −1V to +1V. The Fast Ethernet data rate is 100 MHz and the output voltage (txp, txn), accuracy is ±5%. The edge rates are limited to 4 nS ±1 nS to reduce radiation from the cable.

The Ethernet (10 BaseT) output voltage (txp, txn) level is −2.5V to +2.5V. The Ethernet output voltage (txp, txn) accuracy is ±0.3V or ±12%. The signal is typically a Manchester encoded 10 BaseT signal consisting of a 10 MHz sine wave, which may be generated by a waveshaping circuit consisting of a look-up table and a digital-to-analog converter (DAC) followed by a low pass filter. The total harmonic distortion of the Ethernet signal is greater than 27 dB.

Further examples of existing line driver architectures are shown in FIGS. 2, 3, and 4. FIG. 2 illustrates that a voltage source 11 may be used to drive the line. In this driver architecture, the source voltage (txp1, txn1) is two times the output voltage (txp, txn). In the case of a 3.3V power supply, this architecture can be used for Fast Ethernet where the source voltage is 2V, but not for Ethernet where the minimum output source voltage requirement is 4.4V. Other features shown include cable 12, transformers 13 and 14, and Ethernet receiver inputs 15.

As shown in FIG. 3, a current source 21 may be used to drive the line. The output currents develop the output voltage (txp, txn) directly across the line. In the case of a 3.3V power supply, this driver architecture can be used for both Fast Ethernet, where the output voltage is 1V, and also for Ethernet where the typical output voltage is 2.5V. Other features shown include cable 22, transformers 23 and 24, and Ethernet receiver inputs 25.

A variation on the current driver is the use of a bridge current driver 31, as shown in FIG. 4. This driver includes four current sources, I1, I2, I3, and I4. The line termination resistors are now connected to an additional output voltage, Vmid. Vmid is half the supply voltage or 1.65V. This driver architecture uses 3 pins, but requires half the current of a two-pin current driver.

In the case of Fast Ethernet, each of the current sources, I1, I2, I3, and I4, is 20 mA. A +1V (txp, txn) signal is generated when I4 sources 20 ma, which flows through R1, R2 and L1 into I2. A 0V (txp,txn) signal is generated when the I4 current flows into I1 and the I3 current flows into I2. A −1V (txp, txn) signal is generated when I3 sources 20 ma, which flows through R1, R2 and L1 into I1. In the case of Ethernet, the current levels are 50 mA, generating a peak voltage (txp, txn) of 2.5V. Other features depicted in FIG. 4 include the cable 32, transformers 33 and 34, and receiver inputs 35.

In the early development of Ethernet, drivers were developed in single units. Although single drivers are still used in cards for installation at specific nodes, there is a requirement in hub design to increase the number of drivers that can be implemented on a single card. It is known in the prior art to provide quad drivers, wherein four drivers are implemented on a single card. Even though there has been a tendency toward hubs with 8, 16 or 32 ports, it has not been possible to improve upon the quad drivers already in existence. This is primarily due to the fact that the common power requirement of the drivers is such that if more than four drivers are implemented, the package power dissipation has been too high. There is, therefore, a need for drivers with lower power dissipation, so as to facilitate the provision of multi-port drivers in hubs and switches.

SUMMARY OF THE INVENTION

These needs and others are met by the line driver circuit of the present invention, which has a reduced power requirement, and as such can be implemented in greater numbers on an integrated circuit than the well-known quad driver. The inventive line driver circuit is a combined Ethernet/Fast Ethernet driver circuit that incorporates the necessary current driver for Ethernet combined with the accuracy offered by a voltage driver for Fast Ethernet.

In accordance with one embodiment of the invention, a driver circuit for driving a line in a network comprises first driving means for driving the line, second driving means for driving the line, and switching means for switching between the first and second driving means. Preferably, the switching means operates to make only one of the first or second driving means active at any one time.

In one aspect of the invention, the switching means comprises a first input for enabling and disabling the first driving means and a second input for enabling and disabling the second driving means, wherein, when one of the first or second driving means is enabled, the other driving means is disabled. The first driving means may comprise one or more current sources, which may be connected in a bridge configuration.

In another form of the invention, the driver circuit is connected to a supply voltage and further comprises a plurality of terminating elements coupled to an output voltage of the driver circuit, wherein the driver circuit operates to limit the output voltage to about one-half of the supply voltage. The second driving means may comprise a voltage source.

In yet another aspect of the present invention, a driver circuit for driving lines in a network comprises a plurality of current sources connected in a bridge configuration and coupled to the lines to provide a bridge current driver, a voltage source coupled to the lines to provide a voltage driver, and a plurality of terminating elements coupled to the current sources, the voltage source, and to the lines. The driver circuit further includes a supply voltage coupled to the bridge current driver and the voltage driver, wherein the supply voltage includes a mid-point termination voltage, and switching means for switching between the bridge current driver and the voltage driver, such that, when the bridge current driver is selected, the terminating elements are coupled to the mid-point termination voltage and the lines are driven from the bridge current driver. When the voltage driver is selected, the bridge current driver is disabled, and the terminating elements are coupled to the voltage driver. Preferably, the mid-point termination voltage is approximately equal to one-half the supply voltage, and the terminating elements comprise a network of resistors.

In still another aspect of the invention, a line driver circuit comprises a current source coupled to a first pair of terminals of a termination network and a voltage source coupled to a second pair of terminals of the termination network, wherein the voltage source operates in a first configuration to establish a first mode of operation, and in a second configuration to establish a second mode of operation. The current source may comprise a plurality of current sources. Preferably, the plurality of current sources are arranged in a bridge configuration.

The first mode of operation of the line driver circuit comprises voltage source drive mode. The first configuration of the line driver circuit corresponding to voltage source drive mode comprises driving the second pair of terminals of the termination network with the voltage source while the current source is maintained in an OFF state.

The second mode of operation of the line driver circuit comprises current source drive mode. The second configuration of the line driver circuit corresponding to current source drive mode comprises driving the first pair of terminals of the termination network with the current source while the voltage source maintains the second pair of terminals of the termination network at a predetermined, non-zero potential. The predetermined, non-zero potential preferably comprises one-half of line driver circuit supply voltage.

In still another form of the invention, the termination network comprises a resistive termination network. The resistive termination network preferably comprises a pair of resistors with the voltage source outputs coupled to a first end of each resistor and the current source outputs coupled to a second end of each resistor.

In accordance with yet another aspect of the invention, a method for providing multi-mode driver capability is described. The method comprises the steps of providing a line driver circuit including both a current source and a voltage source, selecting a first or second mode of operation, operating the line driver circuit in a first configuration when the first mode of operation is selected, and operating the line driver circuit in a second configuration when the second mode of operation is selected.

Further objects, features, and advantages of the present invention will become apparent from the following description and drawings.

DETAILED DESCRIPTION OF THE INVENTION

In accordance with the present invention, an Ethernet and Fast Ethernet driver is described that provides distinct advantages when compared to configurations known in the prior art. The invention may be implemented in a driver now described with reference to FIGS. 5 to 8, in which the Fast Ethernet driver has lower power than existing solutions, and the Ethernet bridge current generator is more accurate than existing solutions. For existing architectures, the available power supply is 3.3V ±5% or 3.165V to 3.465V. The operating temperature range is 0° C. to 70° C.

Figure 5:
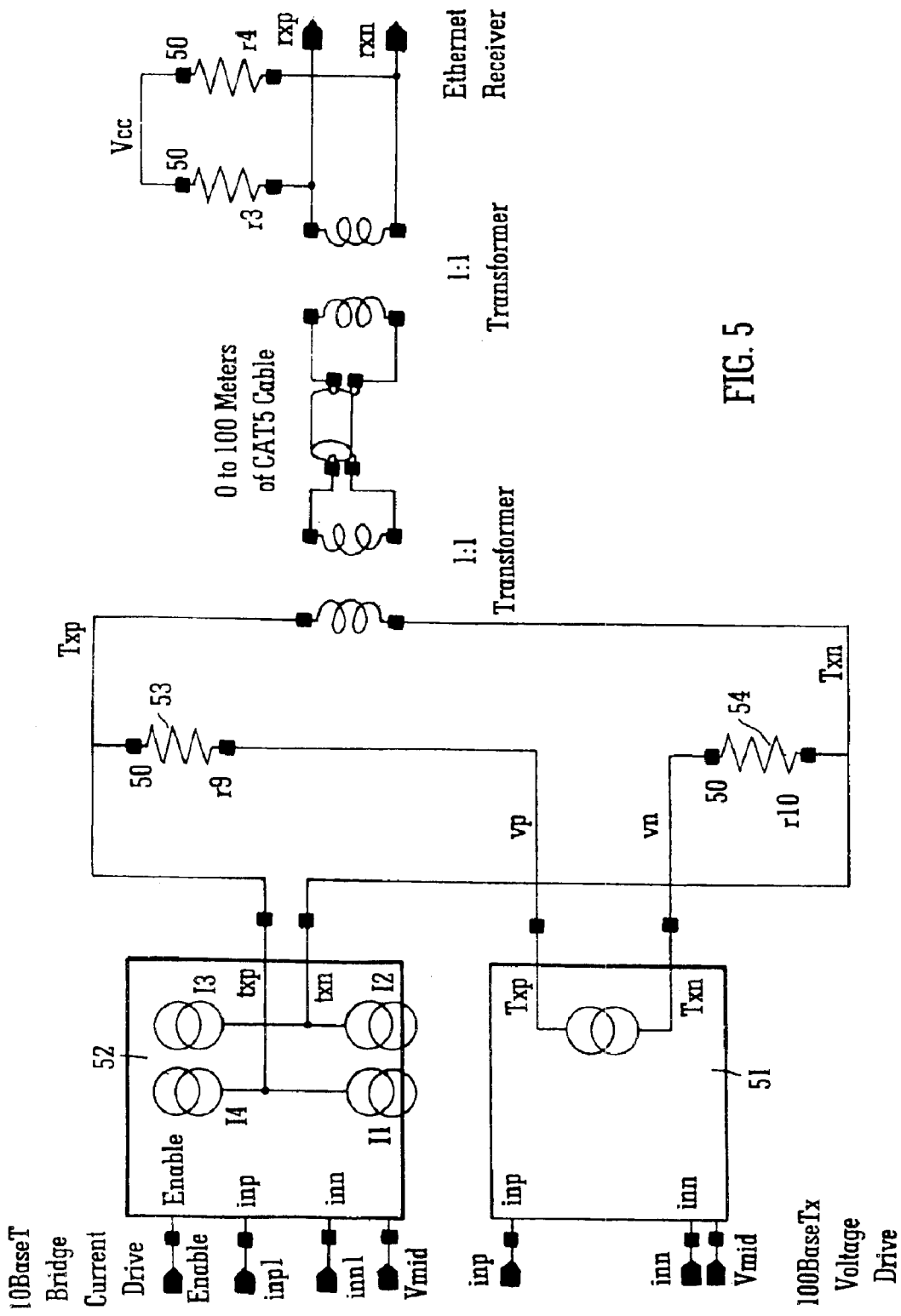
FIG. 5 illustrates a Fast Ethernet and Ethernet driver in accordance with the present invention.

FIG. 5 shows a Fast Ethernet and Ethernet driver according to the present invention. The driver allows both a voltage source drive 51 to be used for Fast Ethernet and a bridge current source drive 52 to be used for Ethernet. The driver architecture uses 4 pins; current source pins txp and txn, and voltage source pins vp and vn. The expressions txp and txn are conventional terms for transmit positive and transmit negative respectively, while the expressions vp and vn indicate positive and negative termination voltages, respectively.

Line termination resistors 53, 54 connect to the two voltage source pins vp and vn. The two modes are combined by examining the termination resistors 53, 54, and by having two inputs. By reconfiguring the termination resistors it is possible to implement either of the two modes. The choice of which mode is utilized is made using standard techniques such as those described previously.

Figure 8:
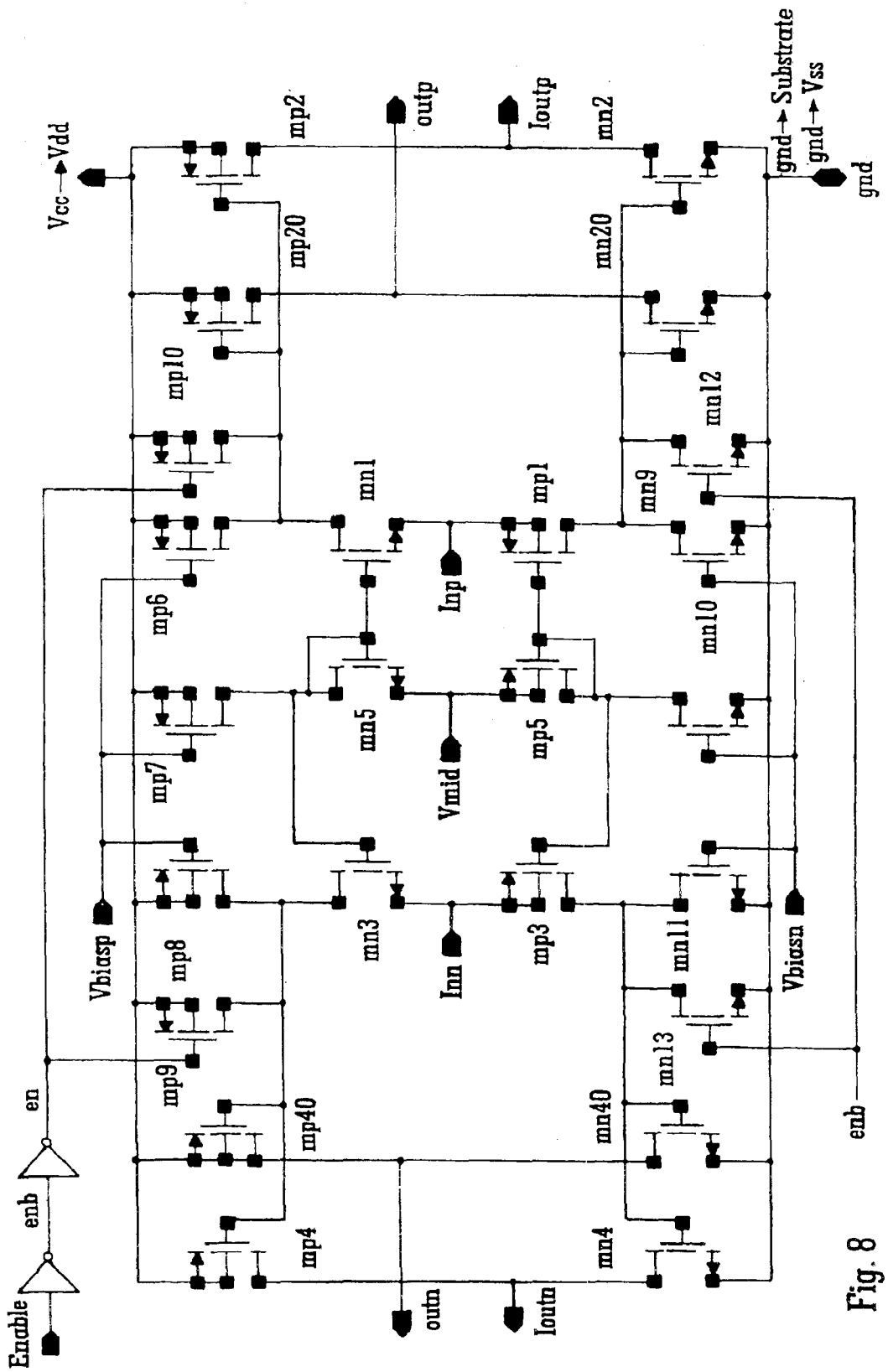
FIG. 8 is a schematic of a switched current feedback amplifier equivalent in accordance with the present invention.

In the case of Fast Ethernet, the bridge currents, (I1, I2, I3 and I4) are turned off, as will be described in greater detail subsequently with reference to FIG. 8, and the line is voltage driven from vp and vn. As Fast Ethernet is required, the txp, txn signal drive level is 0.5V to −0.5V.

The line termination resistor r1 (53) is effectively in series with r3 and r2 (54) is in series with r4 for an incremental signal analysis. In order to obtain the required txp, txn signal, it is necessary to supply +1V, −1V at vp, vn. The load current is thus vp/(r1+r3) or 1V/(100 Ohms); that is, 10 mA. The presented voltage at vp, vn is such that a differential of 2V exists. As such, the on chip voltage drop is 3.3V −2V or 1.3V. This results in an on-chip power dissipation of 1.3V*10 mA, which is equal to 13 mW.

In the case of Ethernet, the vp and vn voltages are set to an active mid-point termination voltage, vmid. Vmid is half the supply voltage or 1.65V for a 3.3V supply. The line is then driven from the bridge currents, I1, I2, I3, and I4. The line voltage is 2.5V with a resultant load current of 2.5V/50 Ohms, or 50 mA. The on chip voltage drop is 3.3V–2.5V or 0.8V, which equates to an on-chip power dissipation of 40 mW.

This new architecture uses the accurate voltage drive to generate the Fast Ethernet's requisite ±5% accuracy signal, and the less accurate current drive to generate the Ethernet's ±12% accuracy signal. The Fast Ethernet signal is provided with a chip power dissipation of 13 mW, which is lower than other known architectures. This results from lower on-chip voltages and load currents.

Figure 1:
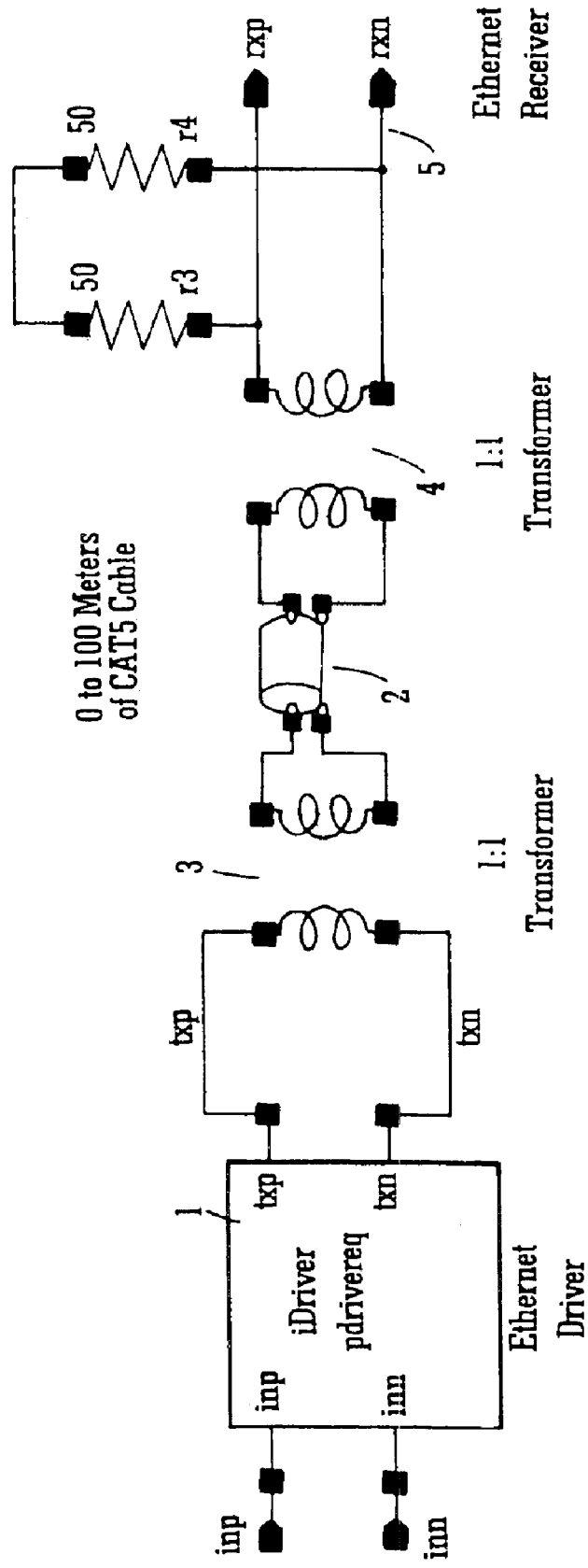
FIG. 1 illustrates an Ethernet driver circuit implementation that is known in the art.
Figure 2:
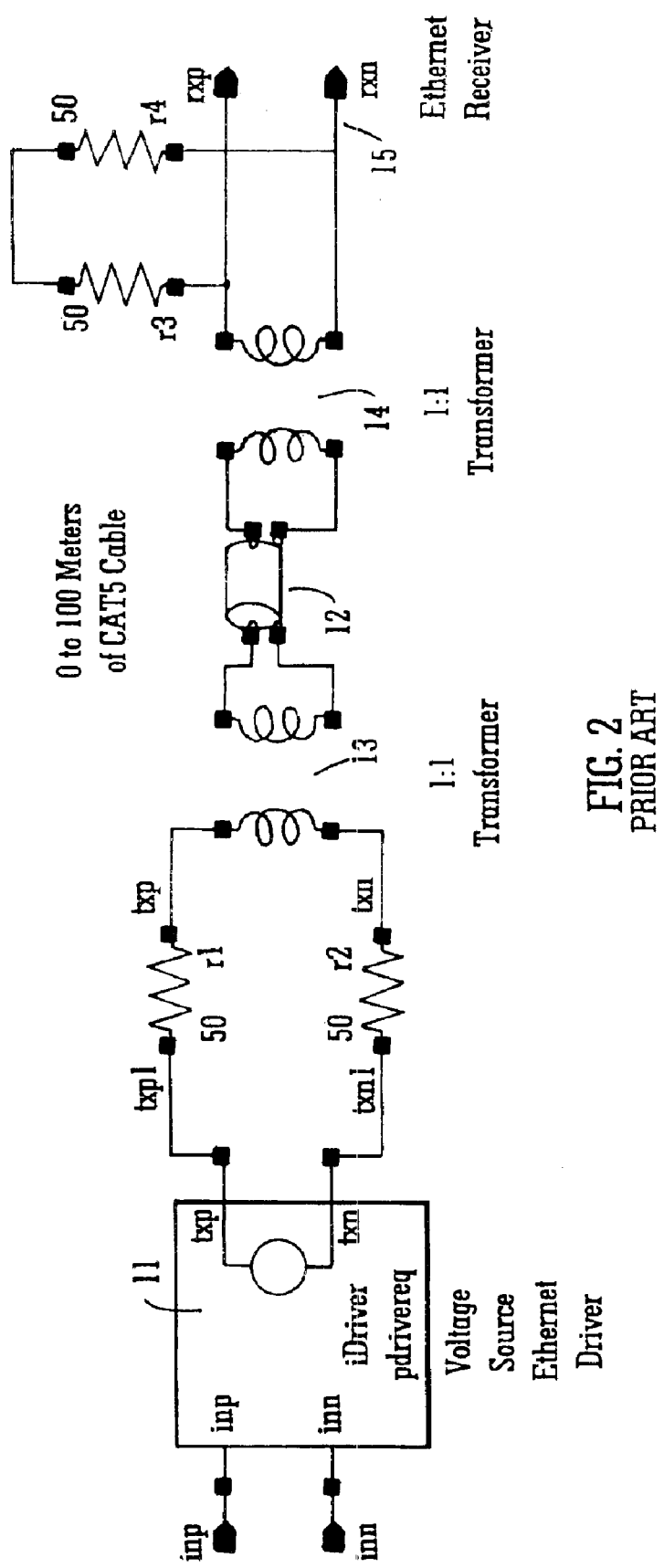
FIG. 2 depicts a voltage driven line driver circuit of the prior art.
Figure 3:
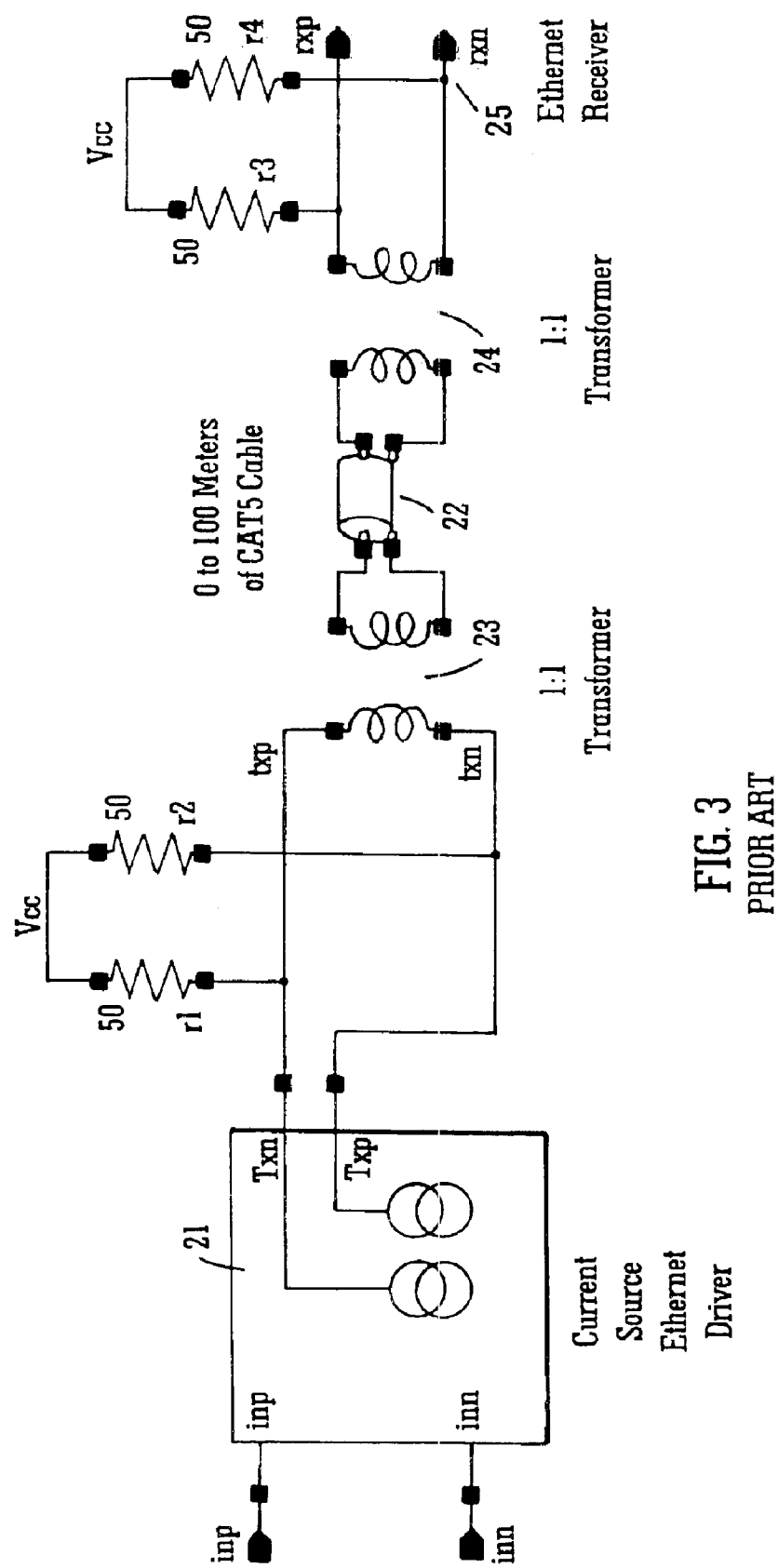
FIG. 3 shows a current driven line driver circuit of the prior art.
Figure 4:
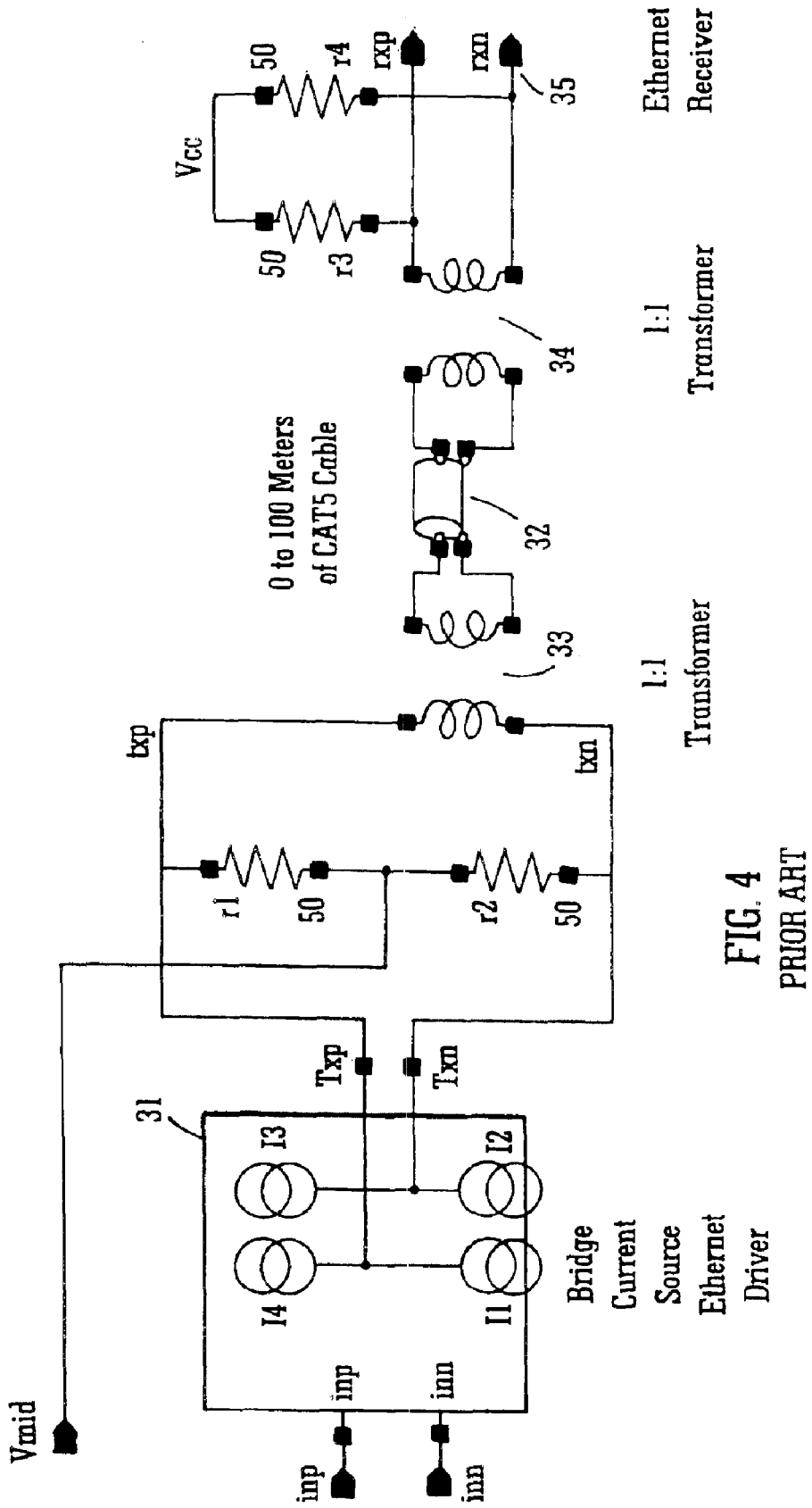
FIG. 4 shows a bridge current driven line driver circuit, in accordance with a known architecture.

A current of 10 mA is required to generate 0.5V across 50 Ohms. Known bridge current drivers, as described with reference to FIG. 4 above, use 20 mA, as 10 mA is delivered to the line and 10 mA is required for across-the-line termination resistors. In the case of the single-ended current driver described with reference to FIG. 3, a 40 mA current is required.

Comparisons of existing architectures with Ethernet and Fast Ethernet drivers in accordance with the present invention (termed "New Driver" in the Tables) are shown in Tables 1 and 2.

TABLE 1

Comparison of Fast Ethernet drivers

| Architecture | Load Current | On Chip Voltage | Power Dissipation |
| --- | --- | --- | --- |
| Current Drive | 40 mA | 2.8 V | 112 mW |
| Bridge Current Drive | 20 mA | 2.3 V | 16 mW |
| New Driver | 10 mA | 1.3 V | 13 mW |

TABLE 2

Comparison of Ethernet drivers

| Architecture | Load Current | On Chip Voltage | Power Dissipation |
| --- | --- | --- | --- |
| Current Drive | 100 mA | 0.8 V | 80 mW |
| Bridge Current Drive | 50 mA | 0.8 V | 40 mW |
| New Driver | 50 mA | 0.8 V | 40 mW |

Figure 6A:
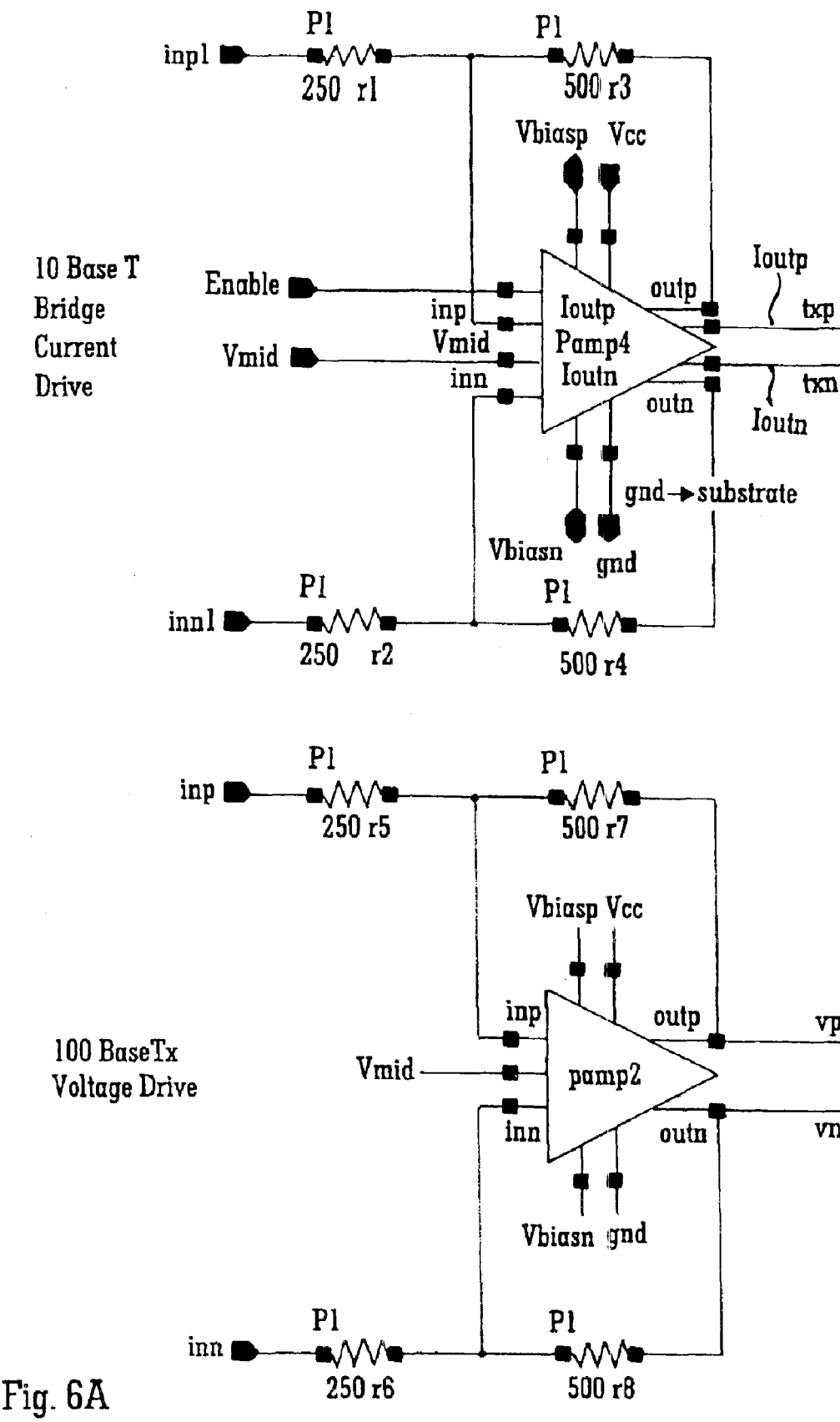
FIG. 6A and FIG. 6B together comprise a schematic diagram of a cable driver in accordance with the present invention.
Figure 6B:
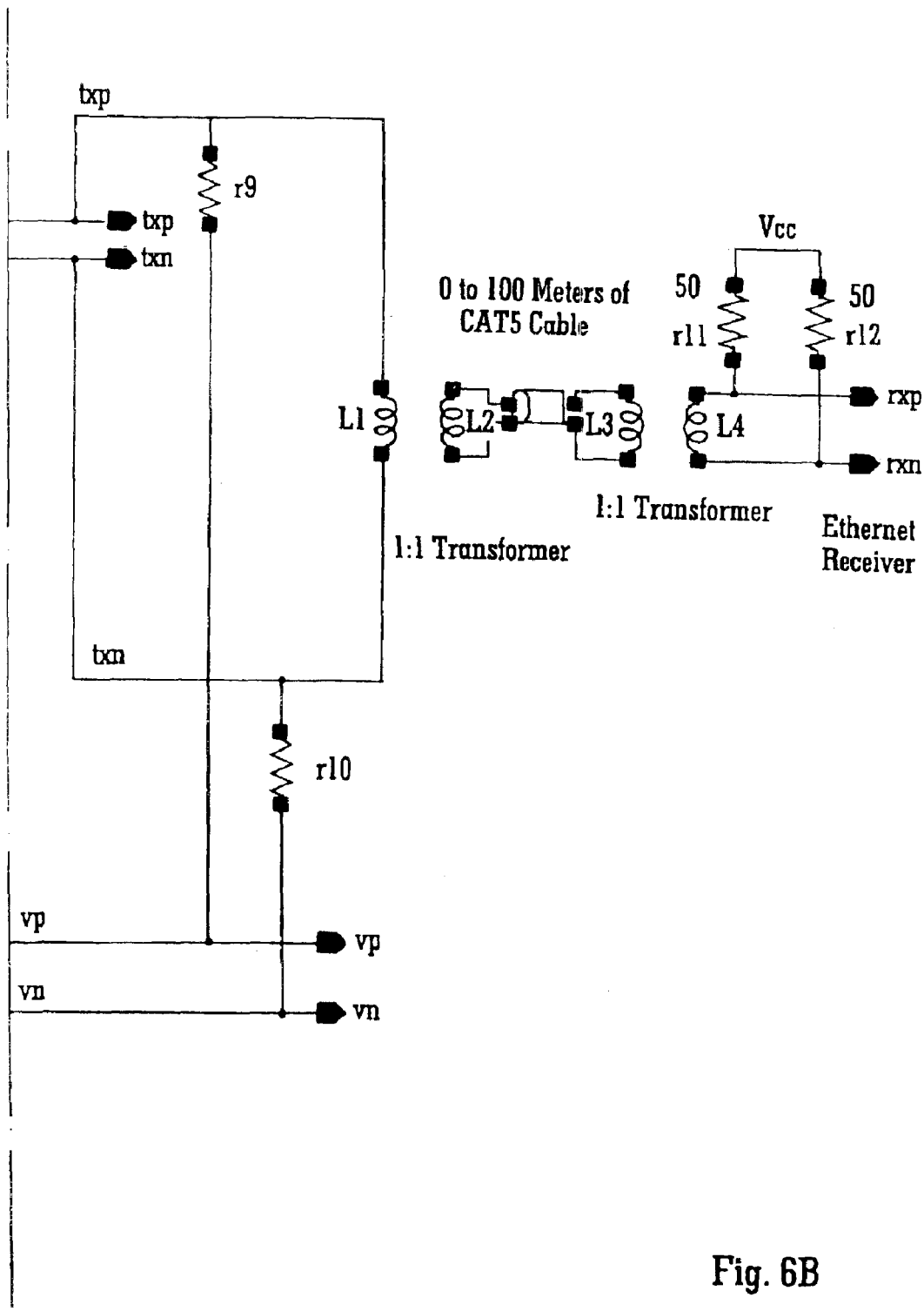

A more detailed representation of an implementation for the Fast Ethernet and Ethernet Driver of FIG. 5 is shown in the schematic of FIG. 6A. The cable driver includes two current feedback amplifiers with a gain of −2. In Fast Ethernet mode, the logic input, Enable, turns off the Ethernet, or 10 BaseT, output currents. The amplifier pamp2 controls the output voltages, vp and vn, and V(vp, vn)=V(txp,txn)*2.

The drivers in accordance with the present invention utilize a new method to generate the bridge currents. In FIG. 6A, the 10BaseT current supplied to the line is from the outputs, Ioutp and Ioutn, of the amplifier pamp4, (see FIG. 8 for details). The currents Ioutp and Ioutn are ratios of the amplifier currents flowing in r3 and r4. In the case of pamp4, mp2 is 10 times the size of mp20, so the current in mp20 is 10 times the current in mp2. Ethernet driver circuits are conventionally biased from a fixed bandgap voltage, Vref, and an external resistor, Rext.

Ibias=Vref/Rext, a fixed current,

Vinp=Rinp*Ibias

Irl=Vinp/rl=Rinp*Ibias/rl, a fixed current, since the ratio Rinp/rl is constant

This current, Ir1, flows in r3 to outp of pamp4, and to either mp20 or mn20 in pamp4. A multiple of Ir1 flows to the line from mp2 or mn2 in pamp4 to Ioutp (FIG. 8). The voltage that is presented to the line at Txp is Txp=r3*Ir1 If the absolute value of r3 is controlled to within ±12%, then the voltage on the line will be within the 10 BaseT specification, and Txp will be a fixed voltage.

The input voltages inp, inn, inp1 and iin1 are derived from an on-chip reference voltage and an external resistor. For Fast Ethernet, the input voltage, (inp and inn) to the cable driver circuit is ±0.25V into 250 Ohms (1 mA), and for Ethernet the input voltage drive is ±0.625V into 250 Ohms (2.5 mA). The single-ended voltage gain of the amplifier, Txp/inp1, is r3/r1.

Figure 7:
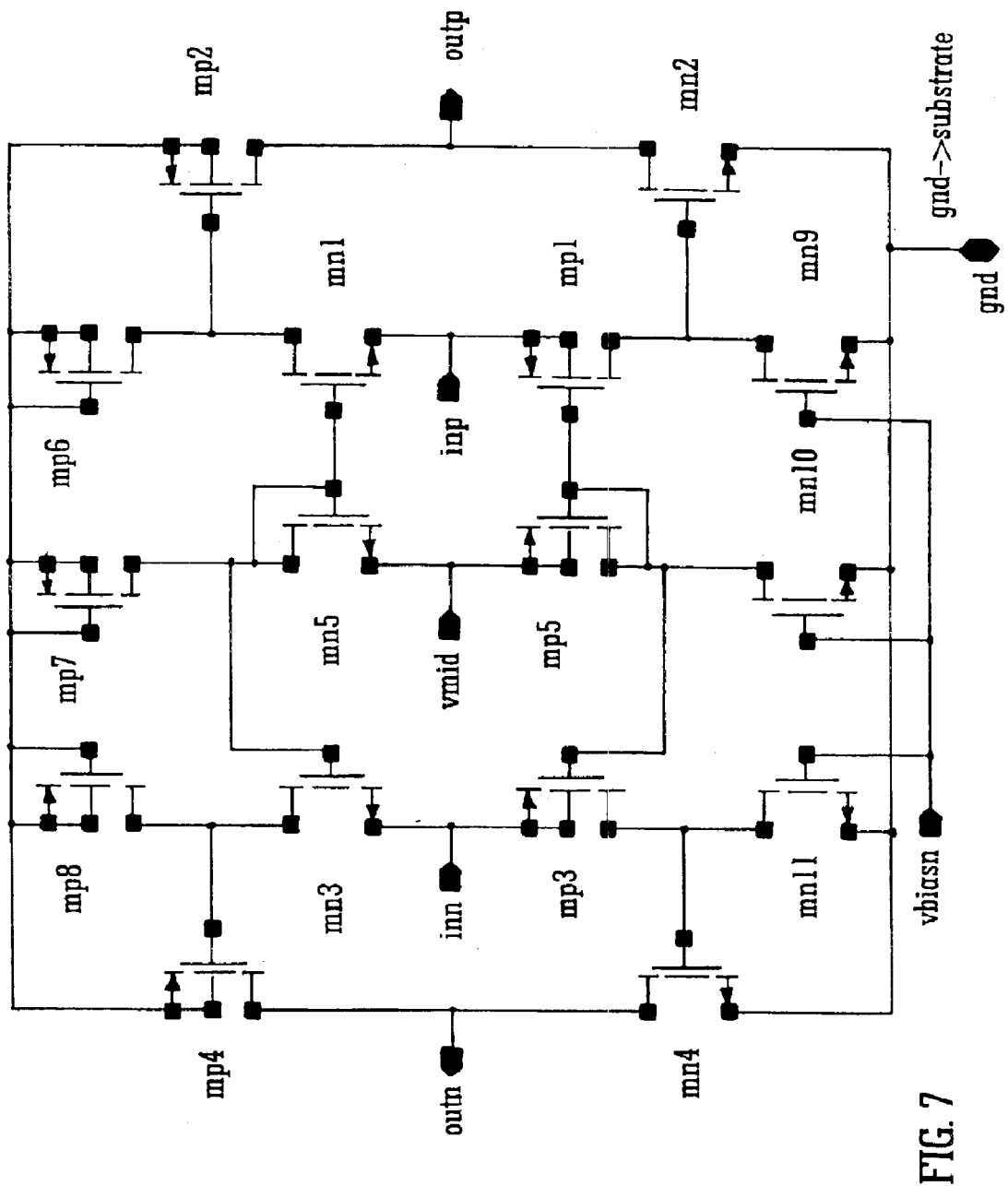
FIG. 7 is a schematic of a current feedback amplifier equivalent in accordance with the present invention.

FIG. 7 is an equivalent circuit of the differential current feedback amplifier, pamp2, of FIG. 6A. The amplifier signals are referenced to half the power supply voltage, Vmid =1.65V. With two inputs and two outputs, the amplifier responds to the current input at inp and inn.

The pmos devices mp8, mp7, and mp6 connected to the voltage bias line vbiasp can be replaced by 3 current sources flowing from Vcc. Also, the nmos devices mn9, mn10, and mn11 connected to the voltage bias line vbiasn can be replaced by 3 current sources flowing to gnd. The input, vmid, is connected to a voltage source set between vcc and gnd or at 1.65v.

When the input, inp, is at the same voltage as the input, vmid, then no current flows in the input inp. When the voltage at input inp is below vmid, then there is a signal current flowing in mn1 in addition to the Imn9 current. This signal current is converted to a voltage gain at the gate of mp2. The current in mp2 increases, providing a current at outp flowing from vcc to outp.

Also, when the voltage at input inp is below vmid, then the current flowing in mp1 is the Imn9 current minus the signal current. This signal current is converted into a voltage gain at the gate of mn2. The current in nm2 decreases, providing less current flowing from outp to gnd.

The amplifier will try to force the voltage at inp to match the voltage at inn by forcing more or less signal current into the inp input. Similarly, because it's a differential amplifier, it will also force inn to match vmid.

The switched current feedback amplifier pamp4 of FIG. 6A (illustrated in FIG. 8) is similar to the FIG. 7 amplifier except for the addition of a logic control, Enable, and the current outputs Ioutn and Ioutp. The logic input, Enable, switches the output of the amplifier.

When Enable is at gnd, enb is high and en is low. When en is low, the pmos switches mp9 and mp10 are on, which turns off the output currents flowing from Vcc to outp, Ioutp, outn and Ioutn. When enb is high, the nmos switches mn12 and mn13 are on, which turns off the output currents flowing from outp, Ioutp, outn and Ioutn to gnd. The auxiliary current outputs, Ioutp and Ioutn, match the current flowing in outp and outn.

When Enable is low, mp9, mp10, mn12, and mn13 turn on. This shuts off the output currents in mp2, mp20, mp4, mp40, mn2, mn20, mn4, and mn40. The currents in mp20, mp40, mn20 and mn40 are controlled by the current feedback amplifier pamp4. The Ethernet bridge currents, at mp2, mp4, mn2, and mn4, are a scaled version of the amplifier currents. In this particular implementation, the scaling factor is 10 times.

Figure 9:
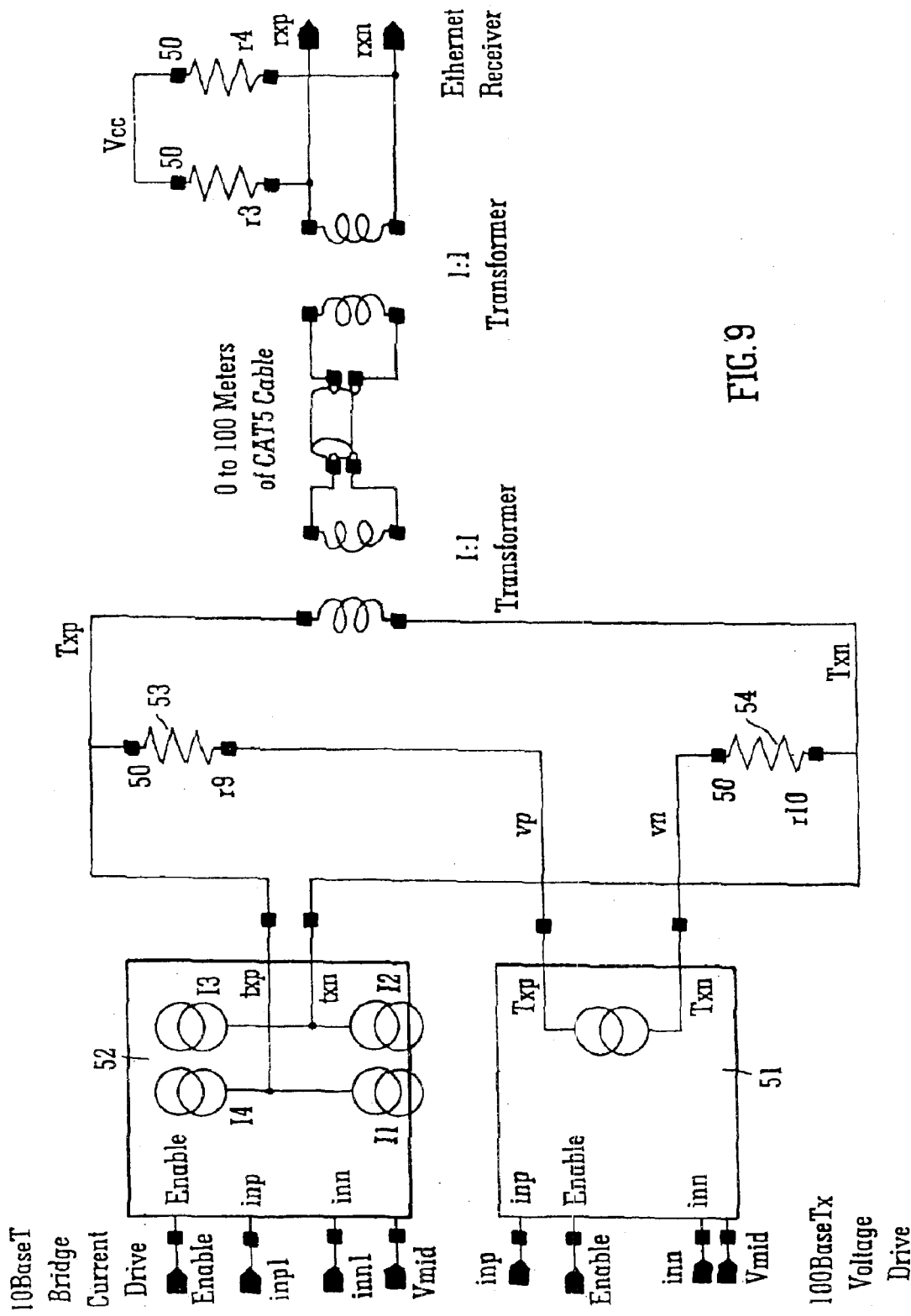
FIG. 9 is a block diagram of a fast ethernet and ethernet driver in accordance with another embodiment of the present invention.

Another embodiment is shown in FIG. 9, wherein respective first and second logic control signals are input to each of the first and second driving means for enabling and disabling the respective first and second driving means. In this arrangement, when one of the first or second driving means is enabled, the other driving means is disabled.

There has been described herein an Ethernet and Fast Ethernet driver which is improved over the prior art. It will be apparent to those skilled in the art that modifications may be made without departing from the spirit and scope of the invention. Accordingly, it is not intended that the invention be limited except as may be necessary in view of the appended claims.

What is claimed is:

1. A driver circuit connected to a supply voltage for driving a line in a network comprising:
   first driving means for driving the line, said first driving means comprising a plurality of current sources arranged in a bridge configuration;
   second driving means for driving the line; and
   at least one control signal for selecting between the first and second driving means; and
   a plurality of terminating elements coupled to an output of the driver circuit;
   wherein the first and second driving means are operated to limit a voltage at the output to about one-half of the supply voltage.

2. The driver circuit of claim 1, wherein the at least one control signal operates to make only one of said first or second driving means active at any one time.

3. The driver circuit of claim 1, wherein the at least one control signal comprises:
   a first logic control input signal for enabling and disabling the first driving means; and
   a second control signal for enabling and disabling the second driving means;
   wherein, when one of the first or second driving means is enabled, the other driving means is disabled.

4. The driver circuit of claim 1, wherein the second driving means comprises a voltage source.

5. A driver circuit for driving lines in a network comprising:
   a plurality of current sources connected in a bridge configuration and coupled to said lines to provide a bridge current driver;
   a voltage source coupled to said lines to provide a voltage driver;
   a plurality of terminating elements coupled to the current sources, the voltage source, and to said lines;
   supply voltages coupled to the bridge current driver and the voltage driver, wherein the supply voltages include a mid-point termination voltage;
   at least one control signal for selecting between the bridge current driver and the voltage driver, such that, when the bridge current driver is selected, the terminating elements are coupled to the mid-point termination voltage, and the lines are driven from the bridge current driver; and
   when the voltage driver is selected, the bridge current driver is disabled and the terminating elements are coupled to the voltage driver.

6. The driver circuit of claim 5, wherein the mid-point termination voltage is approximately equal to one-half the supply voltage.

7. The driver circuit of claim 5, wherein the terminating elements comprise a network of resistors.

8. A line driver circuit comprising:
   a current source coupled to a first pair of terminals of a termination network, the current source comprising a plurality of current sources arranged in a bridge configuration; and
   a voltage source coupled to a second pair of terminals of the termination network;

wherein the line driver circuit operates in a first configuration to establish a first mode of operation, and in a second configuration to establish a second mode of operation, wherein the second mode of operation comprises a current source drive mode wherein the first pair of terminals of the termination network are driven with the current sources while the voltage source maintains the second pair of terminals of the termination network at a predetermined, non-zero potential comprising one-half of line driver circuit supply voltage.

9. The line driver circuit in accordance with claim 8, wherein the first mode of operation comprises voltage source drive mode.

10. The line driver circuit in accordance with claim 9, wherein the first configuration of the line driver circuit corresponding to voltage source drive mode comprises driving the second pair of terminals of the termination network with the voltage source while the current source is maintained in an OFF state.

11. The line driver circuit in accordance with claim 8, wherein the termination network comprises a resistive termination network.

12. The line driver circuit in accordance with claim 11, wherein the resistive termination network comprises a pair of resistors with the voltage source outputs coupled to a first end of each resistor and the current source outputs coupled to a second end of each resistor.

13. A method for providing multi-mode driver capability, the method comprising the steps of:

(a) providing a line driver circuit including both a current source and a voltage source;

(b) selecting a first or second mode of operation;

(c) operating the line driver circuit in a first configuration when the first mode of operation is selected;

(d) operating the line driver circuit in a second configuration when the second mode of operation is selected; and (e) limiting the output voltage to about one-half of a supply voltage for the driver circuit.

* * * * *